(12) United States Patent
Baumgartner et al.

(10) Patent No.: US 8,103,687 B2
(45) Date of Patent: Jan. 24, 2012

(54) SELECTING MEMBER SETS FOR GENERATING ASYMMETRIC QUERIES

(75) Inventors: Patrick John Baumgartner, Pullman, WA (US); Luming Wang, Bellevue, WA (US); Jason Malcolm, Renton, WA (US); Xiaohong Yang, Sammamish, WA (US); Peter Eberhardy, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 395 days.

(21) Appl. No.: 12/132,075

(22) Filed: Jun. 3, 2008

(65) Prior Publication Data

US 2009/0300048 A1    Dec. 3, 2009

(51) Int. Cl.
*G06F 7/00* (2006.01)
*G06F 17/30* (2006.01)
(52) U.S. Cl. .......................... 707/758; 707/766; 707/769
(58) Field of Classification Search .................. None
See application file for complete search history.

(56) References Cited

U.S. PATENT DOCUMENTS

| | | | |
|---|---|---|---|
| 7,089,266 B2 | 8/2006 | Stolte et al. | |
| 7,162,701 B1 * | 1/2007 | Seyffert | 715/854 |
| 2003/0115194 A1 | 6/2003 | Pitts et al. | |
| 2004/0039736 A1 | 2/2004 | Kilmer et al. | |
| 2005/0010566 A1 | 1/2005 | Cushing et al. | |
| 2005/0283494 A1 | 12/2005 | Colossi et al. | |
| 2006/0116984 A1 | 6/2006 | Zurek | |
| 2007/0061292 A1 | 3/2007 | Azizi et al. | |
| 2007/0118501 A1 | 5/2007 | Yan | |
| 2007/0118510 A1 | 5/2007 | Li et al. | |
| 2007/0271227 A1 | 11/2007 | Momen-Pour et al. | |

OTHER PUBLICATIONS

Microsoft® Office Access 2003 Inside Out, John L. Viescas, Publisher: Microsoft Press, Pub. Date: Oct. 29, 2003, ISBN-10:0-7356-1513-6, pages provided: 604-614, appendix.*
Inside Relational Database, 2nd Edition, by Whitehorn et al., 2001, ISBN: 1-85233-401-0, pages provided: 295-299.*
Bellatreche, et al., "OLAP Query Optimization: A Framework for Combining Rule-Based and Cost-Based Approaches", EDA' 2005, pp. 25.
Stolte, et al., "Query, Analysis, and Visualization of Hierarchically Structured Data using Polaris", Proceedings of the Eighth ACM SIGKDD International Conference on Knowledge Discovery and Data Mining, 2002, ACM, pp. 12.
Zhao, "Performance Issues of Multi-Dimensional Data Analysis", 1998, The University of Wisconsin—Madison, pp. 57.

* cited by examiner

*Primary Examiner* — Jay Morrison
(74) *Attorney, Agent, or Firm* — Hope Baldauff Hartman, LLC (57) ABSTRACT

Tools and techniques are described for selecting member sets for generating asymmetric queries. User interfaces provided by this description may include representations of different dimensions that include respective members. These dimensions define hierarchical data structures against which queries are run to generate requested reports. The user interfaces may include representations of members associated with different dimensions, with members from different dimensions arranged in selected orders. The user interfaces may also provide selection tools that activate symmetrical or asymmetrical rendering modes for constructing the query. In the symmetrical rendering mode, the query cross-joins all of the members selected from one dimension with all of the members selected from the other dimension. In the asymmetrical rendering mode, the query cross-joins the first-ordered member from one dimension with the first-ordered member from another dimension, cross-joins the second member from one dimension with the second member from another dimension, and so on.

20 Claims, 8 Drawing Sheets

SELECTING MEMBER SETS FOR GENERATING ASYMMETRIC QUERIES

BACKGROUND

Online analytical processing (OLAP) may model data in cube form. These cube models may define a plurality of dimensions, with these dimensions providing hierarchies for organizing data within the cube model. These dimensions may include members that occupy particular positions within the cube model. Queries may be run against the cube model by specifying members of interest across different dimensions. However, members across different dimensions may or may not match up or intersect on a one-to-one basis. In such cases, mechanisms for defining and displaying these members may become ambiguous.

SUMMARY

Tools and techniques are described for selecting member sets for generating asymmetric queries. User interfaces provided by this description may include representations of different dimensions that include respective members. These dimensions define hierarchical data structures against which queries are run to generate requested reports. The user interfaces may include representations of members associated with different dimensions, with members from different dimensions arranged in selected orders. The user interfaces may also provide selection tools that activate symmetrical or asymmetrical rendering modes for constructing the query. In the symmetrical rendering mode, the query cross-joins all of the members selected from one dimension with all of the members selected from the other dimension. In the asymmetrical rendering mode, the query cross-joins the first-ordered member from one dimension with the first-ordered member from another dimension, cross-joins the second member from one dimension with the second member from another dimension, and so on.

The above-described subject matter may also be implemented as a method, computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for selecting member sets for generating asymmetric queries. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of tools and techniques for selecting member sets for generating asymmetric queries will be described.

Figure 1:
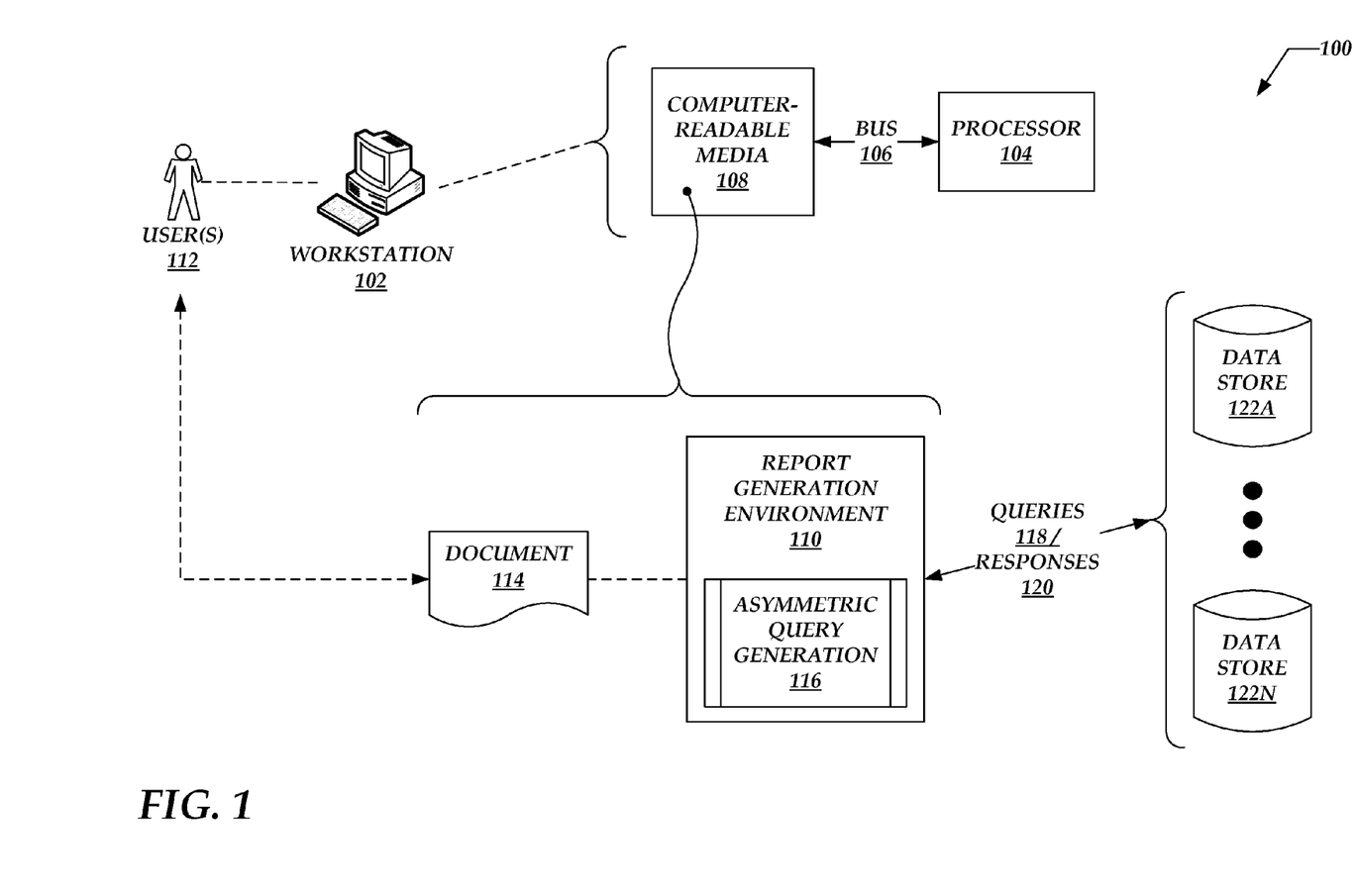
FIG. 1 is a combined block and flow diagram illustrating systems or operating environments related to selecting member sets for generating asymmetric queries.

FIG. 1 illustrates systems or operating environments, denoted generally at 100, related to selecting member sets for generating asymmetric queries. These systems 100 may include one or more workstations 102, with FIG. 1 providing one workstation for ease of illustration only. However, implementations of the description herein may include any number of workstations.

The graphical elements used in FIG. 1 to depict the workstations 102, and other components shown herein, are chosen only to facilitate illustration, and not to limit possible implementations of this description. More particularly, FIG. 1 illustrates the workstation 102 as a desktop computing system, but the workstation could also be a mobile, notebook, or laptop computing system. in addition, the user workstations 102 may communicate with one or more server systems (not shown) over one or more suitable communications networks (also not shown).

Turning to the workstation 102 in more detail, it may include one or more processors 104, which may have a particular type or architecture, chosen as appropriate for particular implementations. The processors 104 may couple to one or more bus systems 106 chosen for compatibility with the processors 104.

The workstations 102 may also include one or more instances of computer-readable storage media 108, which couple to the bus systems 106. The bus systems may enable the processors 104 to read code and/or data to/from the computer-readable storage media 108. The media 108 may represent storage elements implemented using any suitable technology, including but not limited to semiconductors, magnetic materials, optics, or the like. The media 108 may include memory components, whether classified as RAM, ROM, flash, or other types, and may also represent hard disk drives.

The storage media 108 may include one or more data structures and modules of instructions that, when loaded into the processor 104 and executed, cause the workstations 102 to perform various techniques related to selecting member sets for generating asymmetric queries. Examples of these modules may include a report generation environment 110, which may enable users 112 to interact with the workstations 102 in accessing one or more documents 114. In example implementations, the report generation environment 110 may be a spreadsheet application, such as (but not limited to) the EXCEL® spreadsheet software available from Microsoft Corporation of Redmond, Wash. In providing this example, it is noted that the tools and techniques described herein may be implemented with other report generation environments, without departing from the scope and spirit of this description.

The report generation environment 110 may include one or more software modules 116 related to generating asymmetric queries. More specifically, the software modules 116 may contain instructions that when loaded into the processors 104 and executed, cause the workstations 102 to perform the various tools and techniques described herein related to selecting member sets for generating asymmetric queries. The terms "asymmetric" and "asymmetrical" are explained more particularly below. FIG. 1 denotes at 118 examples of these queries, and denotes at 120 examples of reports generated in response to these queries.

In general, these asymmetric queries can be run against one or more data stores 122a and 122n (collectively, data stores 122). These data stores 122 may be housed locally on the workstations 102, or may be housed remotely by one or more server systems (not shown), made accessible to the workstations over suitable communications networks (not shown).

Having described the systems or operating environments shown in FIG. 1, the discussion now turns to a description of data hierarchies or data structures within the data stores 122. This description is now provided with FIG. 2.

Figure 2:
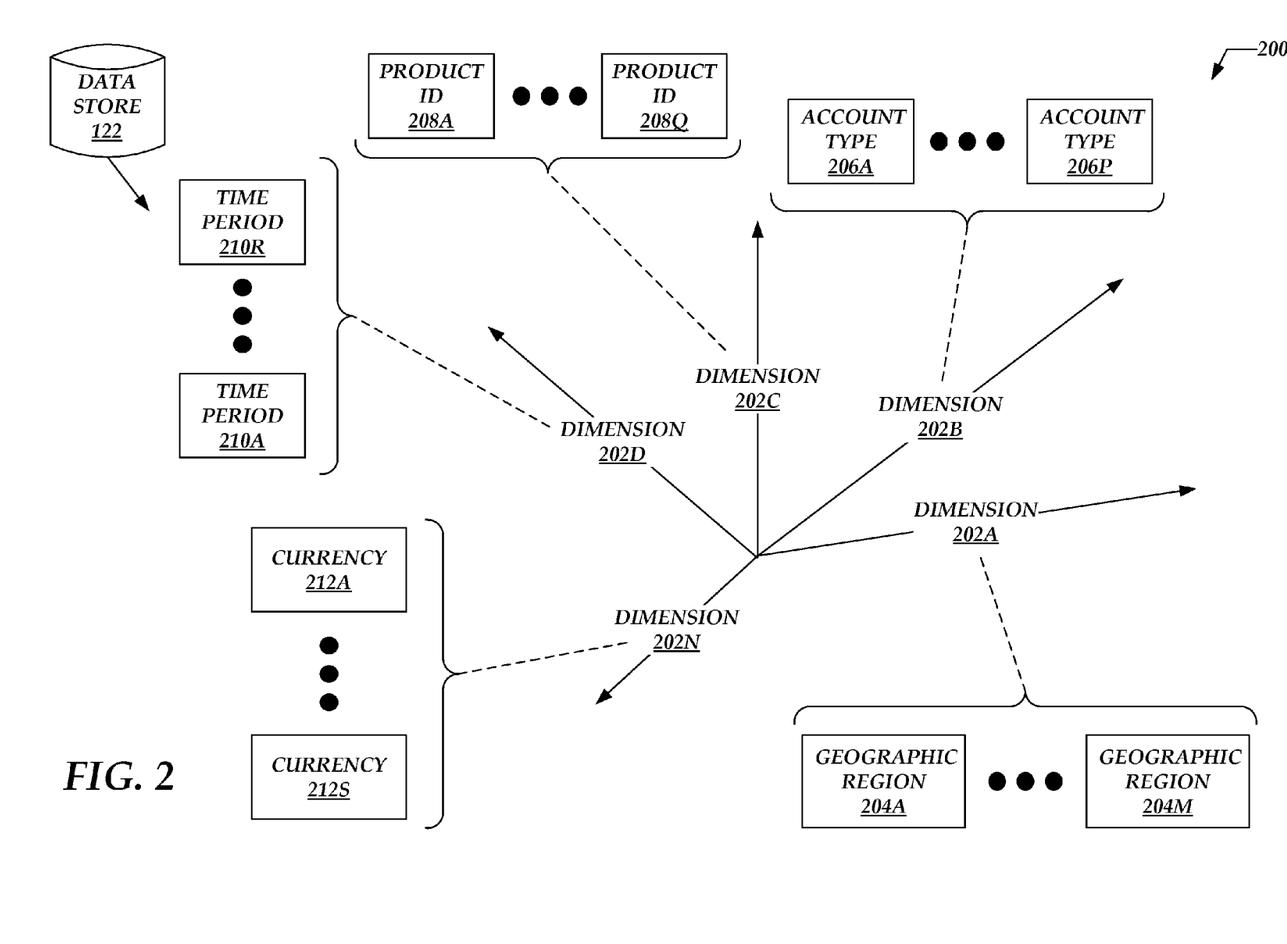
FIG. 2 is a block diagram illustrating data hierarchies or data structures for implementing data stores in connection with selecting member sets for generating asymmetric queries.

FIG. 2 illustrates data hierarchies or data structures, denoted generally at 200, suitable for implementing data stores in connection with selecting member sets for generating asymmetric queries. For convenience of description, but not to limit possible implementations, FIG. 2 may carry forward elements from previous drawings, and denote them with identical reference numbers. For example, FIG. 2 carries forward an example of a data store at 122.

Turning to FIG. 2 in more detail, the data stores 122 may provide a data structure or data hierarchy against which any number of queries (e.g., 118 in FIG. 1) may be run. for example, information contained within the data stores 122 may be organized along any number of dimensions, with FIG. 2 illustrating examples of such dimensions at 202a, 202b, 202c, 202d, and 202n (collectively, dimensions 202). in general, the dimensions 202 represent sets of members within a hierarchical structure used to describe a portion of the data within a data model. The particular types of information represented along the dimensions may vary, depending on the circumstances of particular implementations of this description.

For the purposes of providing this description, but not to limit possible implementations, FIG. 2 provides several examples of the types of information that may be organized along the dimensions 202. In the examples shown, the dimension 202a may include members 204a and 204m (collectively, members 204) that correspond to different geographic regions. These geographic regions may correspond to countries, states or provinces, counties, parishes, cities, townships, or other suitable geographic or political subdivisions or entities.

The dimension 202b may include members 206a and 206p (collectively, members 206) that correspond to different types of accounts or other financial information that may be organized within the data store 122. Examples of the members 206 may include operational expenses, revenue, or other types of financial information tracked within a given enterprise.

The dimension 202c may include members 208a and 208q that correspond to particular products or services sold, leased, purchased, or otherwise of interest to a particular enterprise. These members 208 may, for example, store product identifiers or may implement other mechanisms for identifying or distinguishing particular products or services.

The dimension 202d may include members 210a and 210r (collectively, members 210) that correspond to particular time periods maintained by the data store 122. For example, these time periods may indicate when particular financial transactions occurred in the past. In other examples, these time periods may provide the basis for projections of future transactions, future revenues, or other forward-looking financial calculations. In general, the members 210 may enable the data store 122 to support backward-looking financial reporting of historical data, as well as supporting forward-looking projections. The members 210 may also enable reporting on budgets, and performance to budgets.

The dimension 202n may include members 212a and 212s (collectively, members 212) that correspond to particular currencies, units of exchange, or other monetary units. As discussed in further detail throughout this description, queries and reports (e.g., 118 and 120, respectively, in FIG. 1) may be expressed in terms of these currencies or other monetary units.

Having described the data hierarchies or data structures shown in FIG. 2, the discussion now proceeds to a description of process flows for selecting member sets for generating asymmetric queries. This discussion is now provided with FIG. 3.

Figure 3:
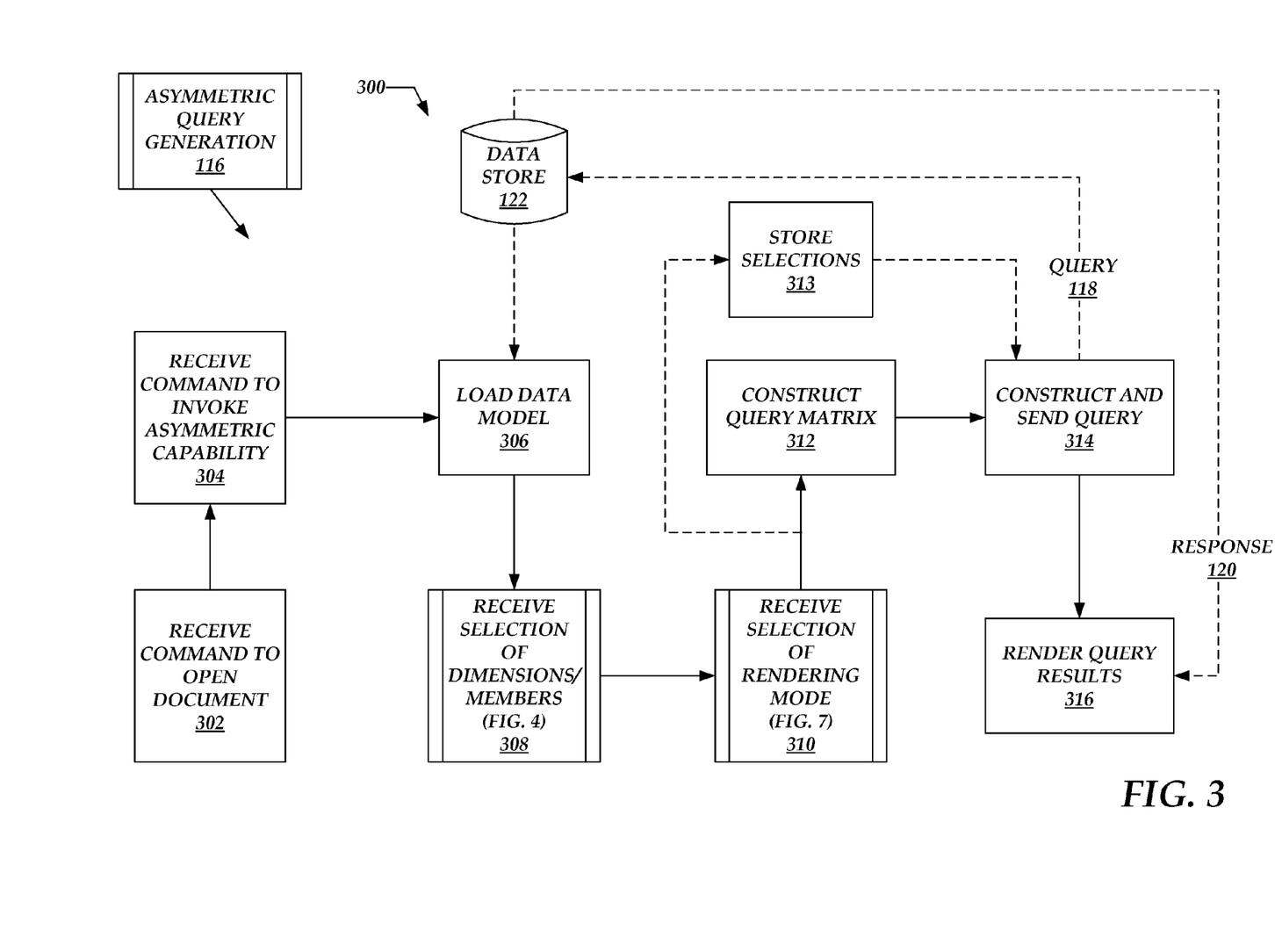
FIG. 3 is a flow chart illustrating processes for selecting member sets for generating asymmetric queries.

FIG. 3 illustrates process flows, denoted generally at 300, relating to selecting member sets for generating asymmetric queries. For convenience of description, but not to limit possible implementations, FIG. 3 may carry forward elements from previous drawings, and denote them with identical reference numbers. For example, FIG. 3 carries forward an example of a data store at 122. In addition, the process flows 300 are described in connection with the asymmetric query generation module 116 only to facilitate the present discussion. However, implementations of this description may perform at least portions of the process flows 300 using other components, without departing from the scope and spirit of this description.

Turning to the process flows 300 in more detail, block 302 represents receiving a command to open a given document for editing or other interaction. For example, referring briefly back to FIG. 1, block 302 may include receiving a command from the user 112 to open the document 114. In different possible scenarios, the document 114 may be an existing document, or a new document, opened within a report generation environment (e.g., 110 in FIG. 1).

Block 304 represents receiving a command from the user to invoke a capability provided by the report generation environment to create or construct asymmetric queries in connection with generating requested reports. For example, assuming that the asymmetric query generation module 116 is provided as an add-on to the report generation environment 110, block 304 may include invoking this add-on through the report generation environment through any convenient mechanism.

In response to the command received in block 304, block 306 represents loading a data model in preparation for constructing asymmetric queries. For example, block 306 may include loading at least part of a data model or data hierarchy, such as that shown at 200 in FIG. 2. In addition, block 306 may include loading data models from one or more data stores 122.

Block 308 represents receiving a selection of particular dimensions and/or members to be included in an asymmetrical query. FIG. 2 provides examples of dimensions at 202, and provides examples of members at 204, 206, 208, 210, and 212. For example, a given user may wish to instruct a query in connection with generating a report that indicates cumulative sales revenue occurring within a number of different geographic regions, expressed in the monetary units recognized within those geographic regions. In this example, assume that the geographic regions of interest are the United States, Canada, and France. Assume further that sales within United States are to be reported in US dollars, that sales within Canada are to be reported in Canadian dollars, and that sales within France are to be reported in US dollars.

In this scenario, referring briefly back to FIG. 2, the dimensions of interest are:

the dimension 202a, which organizes geographic regions, and may contain entries for the United States, Canada, and France;

the dimension 202b, which organizes accounts, and may contain an account for sales revenue; and the dimension 202n, which organizes currencies, and may contain entries for US dollars and Canadian dollars.

In some cases, the user may wish to display more than one dimension along one given axis. In the above example, the user may wish to display representations of geographic regions and currencies along the same axis, as indicated in Table 1:

TABLE 1

Symmetrical Matrix

| | Canada | | US | | France | |
|---|---|---|---|---|---|---|
| | CAD | USD | CAD | USD | CAD | USD |
| Value | $10 | | | $20 | | $20 |

It is noted that implementations of this description may include any number of dimensions and particular matrices or queries, and that the two-dimensional example provided herein is non-limiting. Table 1 provides an example of a "symmetrical" matrix, in which all of the members from one dimension are cross-joined with all of the members from the other dimension. In the above example, the three members from the geographic region dimension are Canada, the US, and France, and the two members from the currency dimension are Canadian dollars and US dollars. Thus, the symmetrical matrix as shown in Table 1 includes six (3×2) cells, representing the intersections of these three members from the two different dimensions.

Table 1 provides examples of revenue values within Canada ($10, expressed in Canadian dollars), within the United States ($20, expressed in US dollars), and within France ($20, expressed in US dollars), as entered in the appropriate cells of Table 1. However, Table 1 also includes some empty cells or intersections that are superfluous or not of interest in this present example. Examples of such extra cells include the intersection corresponding to sales in United States dollars within Canada, the intersection corresponding to sales in Canadian dollars within the US, and the intersection corresponding to sales in Canadian dollars within France.

Table 2, provided below, illustrates an example of an asymmetrical matrix:

TABLE 2

Asymmetrical Matrix

| | Canada | US | France |
|---|---|---|---|
| | CAD | USD | USD |
| Value | $10 | $20 | $20 |

Comparing Table 1 with Table 2, Table 2 does not contain the additional or extra empty intersections shown in Table 1. Put differently, Table 2 matches up specific members of the first dimension with specific members of the second dimension. In this particular example, the number of members chosen from the first dimension is different than the number of members chosen from the second dimension. As shown in Table 2, remember selected from the geographic dimension are matched with two members chosen from the currency dimension, hence resulting in the asymmetrical matrix.

Returning to FIG. 3, block 310 represents receiving a selection of a rendering mode. More specifically, block 310 may include receiving an indication of a rendering mode, as selected by a user. For example, the user may select a symmetric or symmetrical rendering mode, as shown in Table 1, or the user may select in asymmetric or asymmetrical rendering mode, as shown in Table 2.

Block 312 represents constructing a query matrix in response to the rendering mode selected in block 310. Examples of query matrices are shown in Tables 1 and 2 above.

In some implementations, but not necessarily all, the process flows 300 may also perform block 313, which represents storing the selections made in blocks 308 and 310 for later reference. In such scenarios, these selections may be stored in an intermediate file or storage mechanism. As discussed in more detail below with FIG. 3, queries may be constructed or generated based on selections stored in this intermediate file.

Block 314 represents constructing query language that implements the query matrix created in block 312. For example, block 314 may include creating the query in any number of languages or environments, with one non-limiting example language being the MultiDimensional eXpressions (MDX) language. However, it is noted that other languages may be appropriate in particular implementations.

Block 314 may also include sending the constructed query language for execution against one or more data stores (e.g., 122). FIG. 3 carries forward an example of the query at 118.

Block 316 represents rendering the results received from the query sent in block 314. FIG. 3 carries forward an example of a response at 120, and block 316 may include rendering a report incorporating this response according to the rendering mode selected in block 310.

In implementations that include the intermediate file or storage mechanism for containing the selections made in blocks 308 and 310, block 314 may include retrieving representations of these previous selections from the intermediate file. For example, in some scenarios, one set of users (e.g., 112 in FIG. 1) might author queries on behalf of a different set of users, with the latter users viewing the reports generated from the authored queries. In such cases, the process flows 300 may perform blocks 302-314 to enable the authoring users to specify and create the queries. In addition, the process flows 300 may perform block 316 to enable the viewing users to see the reports rendered from these queries. The users who author the queries may or may not be the same users who view the reports rendered from these queries, and the viewing users may not be aware of what selections were made in blocks 308 and 310 in connection with generating the queries.

Having described the process flows 300 shown in FIG. 3, the discussion now turns to a more detailed description of processes relating to receiving selections of dimensions and/or members of these dimensions. This description is now provided with FIG. 4.

Figure 4:
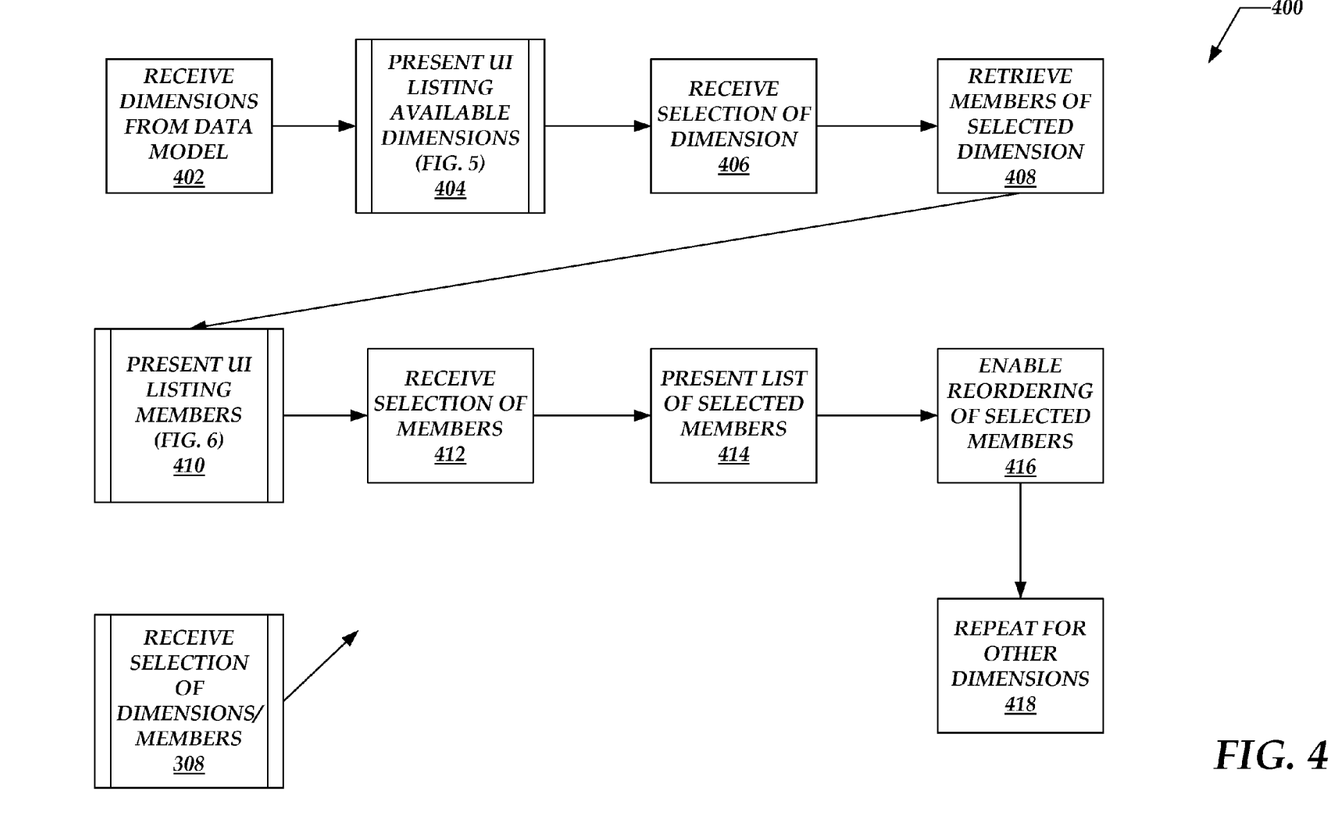
FIG. 4 is a flow chart illustrating processes for receiving selections of dimensions and/or members of those dimensions.

FIG. 4 illustrates process flows, denoted generally at 400, relating to receiving selections of dimensions and/or members of those dimensions. For convenience of description, but not to limit possible implementations, the process flows 400 may be understood as elaborating further on block 308 shown in FIG. 3.

Turning to the process flows 400 more detail, block 402 receives data representing dimensions that are loaded from a data model. For example, block 402 in FIG. 4 may include receiving mention data loaded by block 306. FIG. 2 provides examples of various dimensions at 202.

Block 404 represents presenting a user interface (UI) that incorporates representations of any number of dimensions available for selection by a user. For example, block 404 may include presenting a UI that lists the dimensions available, as received by block 402.

Block 406 represents receiving a selection of one or more dimensions, presented in block 404. For example, returning to the above example involving geographic regions and reporting sales in various currencies, block 404 may include providing representations of the different dimensions 202 defined within the data store 122, and block 406 may include receiving selections of at least the dimension 202a (i.e., geographic regions), the dimension 202b (i.e., account type), and the dimension 202n (i.e., currency).

Block 408 represents extracting or retrieving the members of the dimensions selected in block 406. In turn, block 410 represents providing UI representations of these members. For example, in the foregoing scenario involving the geographic regions and currencies, block 408 may include extracting the members 204 defined within the dimension 202a, extracting the members 206 defined within the dimension 202b, and/or extracting the members 212 defined within the dimension 202n. Block 410 may include providing representations of these extracted or retrieved members within a suitable UI.

Block 412 represents receiving one or more selections of the members presented in block 410. In the ongoing example, block 412 may include receiving selections of the members corresponding to the United States, Canada, and France has presented in block 410.

Block 414 represents presenting a list of the members selected in block 412. In this manner, block 414 may enable the user to visualize which members he or she has selected for inclusion in a given query.

Block 416 represents enabling the user to order or reorder the members selected from within a given dimension, relative to one another. In the ongoing example, assuming that the user has selected the members corresponding to the United States, Canada, and France, block 416 may include enabling the user to arrange these members in a desired or specified order.

Block 418 represents repeating blocks 402-416 any number of times, depending on how many dimensions are to be included within a given query and report. In the ongoing example, assume that in a first iteration of blocks 402-416, the three members corresponding to the United States, Canada, and France are selected from the dimension 202a, and presented in this order. In a second iteration of blocks 402-416, the currency dimension (e.g., 202n) may be selected, and the two members 212 corresponding to United States dollars and Canadian dollars may be selected, and ordered so as to match the countries with the appropriate currency, as desired for the query. More specifically, the members from the geographic dimension may be reordered as appropriate to a line with the members from the currency dimension, and vice versa.

Recall, in this example query, that the sales from the United States and France are to be reported in US dollars, and the sales from Canada are to be reported in Canadian dollars. The final relationships between these members are illustrated in Table 3, as follows:

TABLE 3

| Canada | Canadian dollars |
| United States | United States dollars |
| France | |

In the asymmetric scenario shown in Table 3, unequal numbers of members are selected from different dimensions. In this example, the currency dimension has two members selected, while the geographic region dimension has three members selected. As shown in Table 3, the member "Canada" corresponds to the member "Canadian dollars", and the member "United States" corresponds to the member "United States dollars". Because the member "France" is not associated with a corresponding currency member, "France" may be associated with the member "United States dollars", because this is the last entry populated in the currency dimension.

Having described the process flows 400 in FIG. 4 the discussion now turns to a description of UIs for selecting dimensions and members within those dimensions. This description is now provided with FIGS. 5 and 6.

Figure 5:
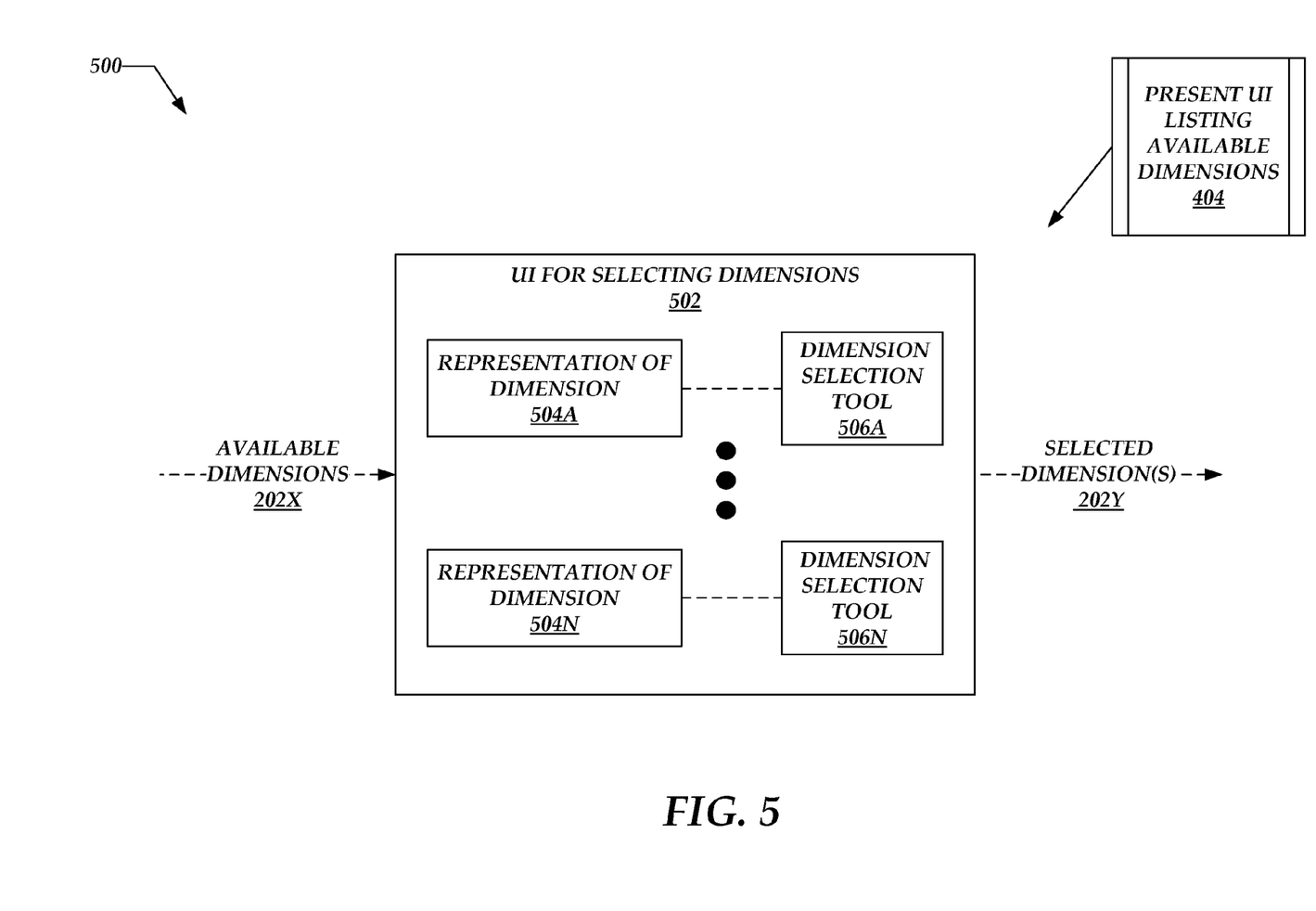
FIG. 5 is a block diagram illustrating examples of user interfaces (UIs) for selecting dimensions containing members to be included in a given query.

FIG. 5 illustrates examples of UIs, denoted generally at 500, suitable for selecting dimensions containing members to be included in a given query. For ease of description, but not to limit possible implementations, the UI examples shown in FIG. 5 may be understood to elaborate further on processing represented in block 404 from FIG. 4.

Turning to FIG. 5 in more detail, FIG. 5 illustrates a UI section 502 that may include representations 504a and 504n (collectively, representations 504) of particular dimensions. FIG. 5 provides two examples of such representations only for clarity of illustration, but not to limit possible implementations. In general, the number of dimensions represented in the UI 502 may depend upon the number of dimensions 202 included in the data store 122. FIG. 5 denotes at 202x the dimensions extracted from the data store 122 as "incoming" into the UI 502.

The representations 504 may respectively be associated with corresponding dimension selection tools, examples of which are shown at 506a and 506n (collectively, dimension selection tools 506). The dimension selection tools 506 may take the form of checkboxes, or other suitable UI tools or devices, that are responsive to user input to indicate that the user wishes to select the dimension corresponding to the activated selection tool.

In some possible scenarios, the user may activate multiple different selection tools at a given time, indicating that the user wishes to include the corresponding dimensions in a given query. In these scenarios, the user may then proceed to the UI shown in FIG. 6 to select the members from the different dimensions to be included in the query. In other possible scenarios, the user may activate only one selection tool for a given dimension at a given time, and then proceed to select members from the selected dimension using the UI shown in FIG. 6. In these latter scenarios, the user may return to the UI shown in FIG. 5, and repeat the process any number of times to select any additional dimensions and members of interest.

FIG. 5 represents the selected dimensions at 202$y$. Typically, although not necessarily, the selected dimensions 202$y$ may be a subset of the available dimensions 202$x$. However, in some cases the user may select all available dimensions 202$x$ to be included in a given query. In these latter cases, the available dimensions 202$x$ and the selected dimensions 202$y$ would coincide.

Having described the UIs 500 for selecting dimensions to be included in a given query, the discussion now turns to a description of additional UIs for selecting and ordering members from the selected dimensions. This description is now provided with FIG. 6.

Figure 6:
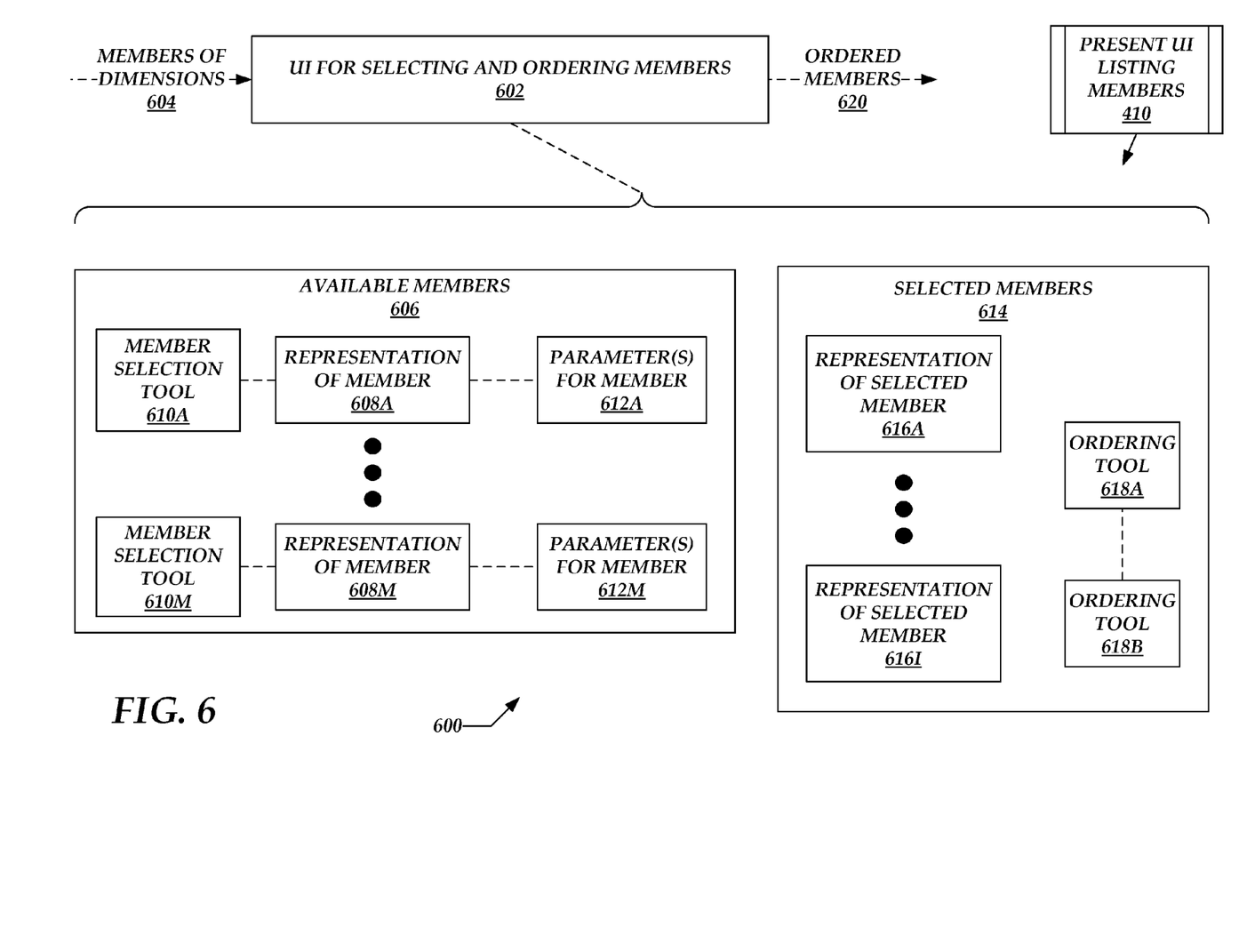
FIG. 6 is a block diagram illustrating examples of UIs for selecting and ordering members from the dimensions selected in FIG. 5.

FIG. 6 illustrates examples of UIs, denoted generally at 600, suitable for selecting and ordering members from the dimensions selected in FIG. 5. For ease of description, but not to limit possible implementations, the UI examples shown in FIG. 6 may be understood to elaborate further on processing represented in block 410 from FIG. 4.

Turning to FIG. 6 in more detail, the UIs 600 may include a set of UI elements 602. In general, these UI elements 602 may receive information representing all members defined for the dimensions selected in FIG. 5. Referring briefly back to FIG. 2, the selected dimensions (e.g., 202$y$ in FIG. 5) may be any of the dimensions 202 shown in FIG. 2. In turn, for a given selected dimension, the UI elements 602 may receive representations of the members of that given selected dimension. FIG. 2 provides examples of such members at 204, 206, 208, 210, and 212, and FIG. 6 represents these members generally at 604.

Turning to the UI elements 602 in more detail, these UI elements 602 may include a field or area 606 providing representations of the members from a given dimension that are available for selection. FIG. 6 provides examples of such member representations at 608$a$ and 608$m$ (collectively, member representations 608). In general, the number of member representations at 608 occurring in a given instance of the field 606 may depend on the number of members defined for a particular dimension. Accordingly, the two representations 608 shown in FIG. 6 are understood as illustrative, rather than limiting.

The member representation 608 may respectively be associated with member selection tools, with FIG. 6 illustrating two examples of such tools at 610$a$ and 610$m$ (collectively, member selection tools 610). In general, the above description of the dimension selection tools 506 in FIG. 5 applies equally to the member selection tools 610 in FIG. 6. Thus, the member selection tools 610 may take the form of checkboxes or other suitable UI devices responsive to user input to activate the corresponding member for further processing. In some cases, the dimension selection tools 506 and/or the member selection tools 610 may operate in response to one or more clicks or other activations from a user.

As shown in FIG. 6, field 606 may also include one or more parameter subfields 612$a$ and 612$m$ (collectively, parameter subfields 612) associated respectively with the member representations 608. The parameter subfields 612$a$-612$m$ may provide additional information corresponding respectively to the members represented at 608$a$-608$m$. Examples of the information contained within the parameter subfields 612 may vary widely across different implementations. However, for the purposes of facilitating this description only, examples of these parameters may include names associated with the members represented at 608, short descriptions of these members, unique identifiers associated with these members, or the like. In general, the parameter subfields 612 may contain any information appropriate to enable users to make informed decisions on which members of a given dimension to select for the query.

In some implementations, the member representations 608 may be arranged in a column, such that the individual member representations define respective rows within the area 606. The parameter subfields 612 for the different members may be arranged in columns, such that individual instances of the parameters are aligned with their corresponding members. In turn, the member selection tools 610 may be arranged as another column, with the individual member selection tools aligned with their corresponding members.

In operation, users may activate the member selection tools 610 for any particular members of the selected dimensions to be included in a given query. After the user has selected particular members of one or more given dimensions, representations of the selected members may be displayed in another area 614 of the UI 602. Turning to this area 614 in more detail, it may contain representations of any number of selected members, with FIG. 6 providing two examples at 616$a$ and 616$i$ (collectively, selected member representations 616).

The area 614 may also include one or more instances of ordering tools, with FIG. 6 illustrating examples of ordering tools at 618$a$ and 618$b$ (collectively, ordering tools 618). These ordering tools 618 may be operative to reorder the selected member representations at 616 relative to one another. For example, the ordering tools 618 may include respective buttons responsive to user input to reorder one of the selected member representations 616 relative to the other selected member representations 616. In other examples, the ordering tools 618 may include one or more buttons for arranging the selected member representations 616 in a sending or descending order. This order may be characterized as alphabetical order, the numerical order, alphanumerical order, or any other suitable ordering mechanism as appropriate in different implementations.

It is noted that users may interact with the UI elements 602 any number of times as appropriate, considering how many dimensions have been selected, and considering how many members of those dimensions have been selected. Once a given user has finished selecting dimensions, selecting members from those dimensions, and ordering the selected members, the user may exit the UI elements 602. In general, FIG. 6 represents the ordered members at 620.

It is also noted that the UIs 500 and 600 may or may not be presented every time that a query is run. For example, the selections made in the UIs above may be stored in one or more intermediate files or other suitable storage mechanisms. Afterwards, queries may be generated by retrieving the selections from the intermediate files, without presenting the above UIs. As described above, in some scenarios, one or more users may create queries that are run to render reports to other users. In these scenarios, the UIs 500 and 600 may be exposed only to the former users, but not to the latter users.

Having described the UIs 600 for selecting and ordering members from one or more selected dimensions, the discussion now proceeds to a description of process flows for defining a rendering mode for a given query. This discussion is now presented with FIG. 7.

Figure 7:
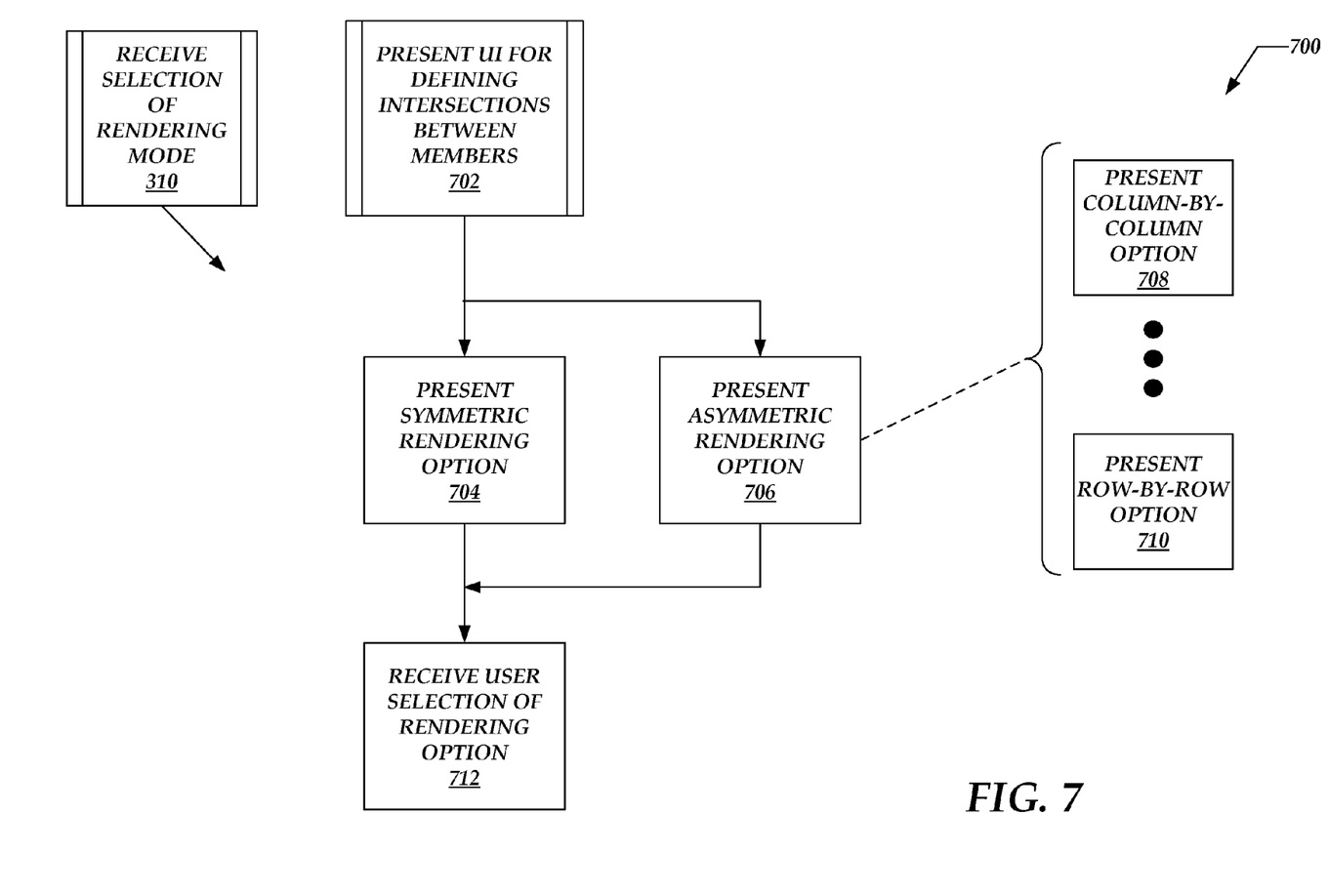
FIG. 7 is a flow chart illustrating processes for defining or selecting a rendering mode for a given query.

FIG. 7 illustrates process flows, denoted generally at 700, for defining or selecting a rendering mode for a given query. For convenience of description, but not to limit possible implementations, the process flows 700 as shown in FIG. 7 may be understood as elaborating further on the processing represented in block 310 in FIG. 3.

Turning to the process flows 700 in more detail, block 702 represents presenting a user interface (UI) that enables users to define intersections between members. Block 702 may include presenting a UI, such as the example shown in FIG. 8, and described after FIG. 7.

The UI presented in block 702 may present the user with several different rendering options. For example, the UI may present a symmetric rendering option, as represented generally in block 704. Recalling previous discussion, the UI is presented in FIGS. 5 and 6 may enable users to select a plurality of members from two or more dimensions. accordingly, block 704 may include presenting in the UI an option to render all possible intersections any members chosen from the two or more dimensions more specifically, the "Render all possible intersections" mode may render a symmetrical cross join for a given row or column segment. For example, assume that the following members are selected for two dimensions on Columns:

Dimension 1: Member A (Members+Children*); Member B; Member C
Dimension 2: Member X; Member Y;
(*Where 'A' has children 'a' and 'b')

If the user activates block 704 to set the rendering mode to Render All Possible Intersections for Columns, the query would be constructed to render the following on columns:

| A | | a | | b | | B | | C | |
|---|---|---|---|---|---|---|---|---|---|
| X | Y | X | Y | X | Y | X | Y | X | Y |

As shown in the above example of a symmetric rendering, all of the members from dimension 1 (i.e., members A, a, b, B, and C) are cross-joined with all of the members of the dimension two (i.e., members X and Y). In addition, while this discussion provides examples of rendering on columns, implementations of this description may also render on rows, without departing from the scope and spirit of this description.

Block 706 represents presenting an asymmetrical rendering option within the UI presented in block 702. For example, block 706 may include presenting a UI option for rendering column-by-column, as represented generally at block 708. In another example, block 706 may include presenting a UI option for rendering row-by-row, as represented generally at 710.

Turning to block 706 in more detail, this block may represent rendering the matrix by cross-joining the set of members selected from the dimensions, in the order in which the members are arranged. For example, assume that the following members are selected and ordered as shown for rendering two dimensions on Columns:

Dimension 1: Member A; Member B; Member C
Dimension 2: Member X; Member Y; Member Z If the "Render Column by Column" mode is set in block 708, the columns would be constructed to render the following:

| Member A | Member B | Member C |
|----------|----------|----------|
| Member X | Member Y | Member Z |

In this example, rather than cross joining all members of those dimensions, the first member of the first dimension is intersected with the first member of the second dimension, the second member of the first dimension is intersected with the second member of the second dimension, and so on.

In some cases, the selected dimensions may include different numbers of members. More specifically, if the same number of members is not selected for all dimensions rendered along a given axis, then the "none" member may be added to the query to even out or equalize the rows or columns. For example, assume that the following members are selected for rendering two dimensions on Columns:

Dimension 1: Member A; Member B; Member C
Dimension 2: Member X; Member Y;

If the "Render Column by Column" mode is set in block 708, the column may be constructed to render the following:

| Member A | Member B | Member C |
|----------|----------|----------|
| Member X | Member Y | None     |

In the previous examples of the "Render Column by Column" mode, only specific members were selected for each dimension. However, sets of members may also be selected from particular dimensions. More specifically, member selection sets may be processed as illustrated in the following examples. in a first example, assume that the following members and selection sets are selected for rendering two dimensions on Columns:

Dimension 1: Member A (Members+Children*); Member B
Dimension 2: Member X; Member Y
(*Where 'A' has children 'a' and 'b')

If the "Render Column by Column" mode is set, the column may be constructed to render the following:

| Member A | a        | b        | Member B |
|----------|----------|----------|----------|
| Member X | Member X | Member X | Member Y |

Only for the purposes of providing examples in the context of this description, and not to limit possible implementations, example MDX code for this column set may be defined as follows:

{[Dimension 1].[MemberA],[Dimension 1].[MemberA]. Children}*{[Dimension 2]. [Member X]},
{[Dimension 1].[Member B]}*{[Dimension 2].[Member Y]}

In some cases, member selection sets may intersect between two or more different dimensions. In such cases, rendering may occur as shown in the following example. Assume that the following members and selection sets are selected for 2 dimensions on Columns:

Dimension 1: Member A (Members+Children*); Member B

Dimension 2: Member X (Members+Children**); Member Y (*Where 'A' has children 'a' and 'b') (**Where 'X' has children 'x')

If the "Render Column by Column" mode is set, the column may be constructed to render the following:

| Member A | Member A | a | a | b | b | Member B |
|---|---|---|---|---|---|---|
| Member X | x | Member X | x | Member X | x | Member Y |

The MDX for this column set may be defined as follows:
{[Dimension 1].[MemberA],[Dimension 1].[MemberA].Children}*
{[Dimension 2].[Member X],[Dimension 2].[Member X].Children},
{[Dimension 1].[Member B]}*{[Dimension 2].[Member Y]}

Member sets may be nested to an arbitrary level, as appropriate in different implementations. Accordingly, the two levels of nesting discussed in the previous examples are understood to be illustrative, rather than limiting.

Block 712 generally represents receiving a user selection of a rendering option to be applied in constructing a given query. The rendering option received in block 712 may include any of the foregoing examples, in addition to other examples possible in light of the description and illustrations provided herein.

Having described the process flows 700 related to the selection of rendering modes in FIG. 7, the discussion now proceeds to a description of example UIs that may be presented to facilitate the selection of rendering modes. This description is now provided with FIG. 8.

Figure 8:
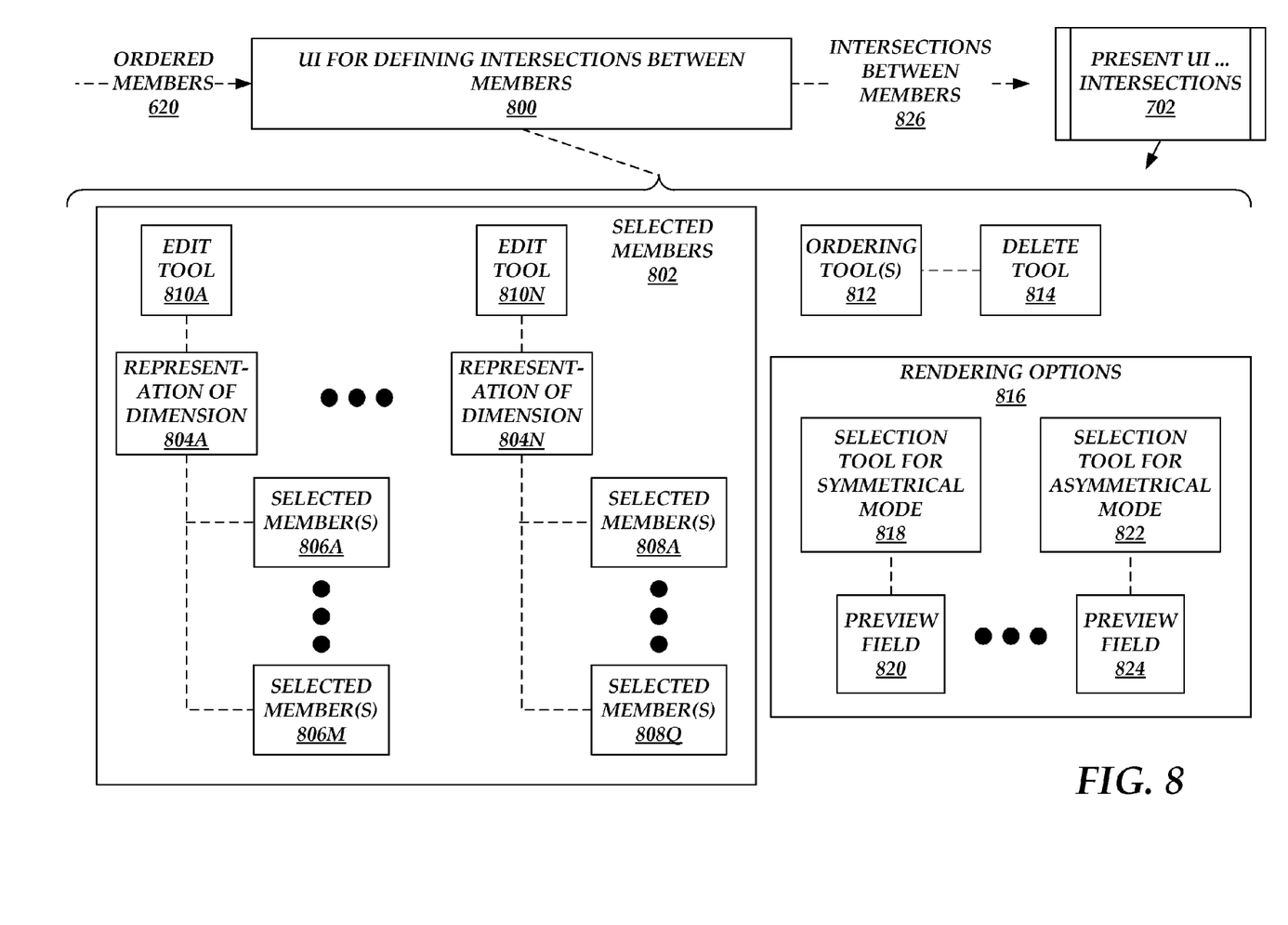
FIG. 8 is a block diagram illustrating user interface elements for selecting rendering modes.

FIG. 8 illustrates user interface (UI) elements, denoted generally at 800, that may be presented to facilitate the selection of rendering modes. Without limiting possible implementations, the user interfaces 800 may be understood as elaborating further on the processing represented in block 702 in FIG. 7.

In general, the UI elements 800 may provide an interface by which the user may define intersections between members selected from a plurality of different dimensions. For convenience, FIG. 8 carries forward the ordered members 620 from FIG. 6.

Turning to the UI elements 800 in more detail, the UI elements 800 may include a selected members area 802 providing representations of the selected dimensions, as well as the members selected from those dimensions. More specifically, FIG. 8 illustrates two example representations of dimensions 804a and 804n (collectively, dimension representations 804). However, it is noted that the number of dimension representations 804 may vary in different scenarios, depending on how many dimensions a given user selects at a given time.

Respective ones of the dimension representations 804 may be associated with representations of those members selected for a particular dimension. For example, FIG. 8 illustrates example representations of selected members at 806a and 806m (collectively, member representations 806), which are associated with the dimension representations 804a. In addition, FIG. 8 illustrates example representations of selected members at 808a and 808q (collectively, member representations 808), which are associated with the dimension representations 804n. It is noted that the dimension representations 804 may be associated with any number of member representations 806 or 808, depending on how many members have been selected for particular dimensions, with the example shown in FIG. 8 provided only for ease of illustration.

Within the selected members area 802, users may visualize how the members of the different dimensions are aligned with one another, and how these members would intersect if a query work to be constructed and generated with the members in this alignment. If a given user is satisfied with the alignment of members with one another, he or she may initiate construction of the query by activating an "OK" button, or other similar device (not shown in FIG. 8). however, if the given user wishes to adjust the alignment of these members with one another, or to select or remove members within a given dimension, the selected members area 802 may include respective edit tools 810a and 810n (collectively, edit tools 810), which are associated respectively with the dimension representations 804a and 804n. For example, if the user wishes to adjust or reorder the members selected for the dimension represented at 804a, the user may activate the edit tool 810a. Similarly, if the user wishes to adjust or reorder the members selected for the dimensions represented at 804n, the user may activate the edit tool 810n.

The edit tools 810 may be responsive to user input to activate and present the user interface is shown in FIG. 5 and/or FIG. 6. In this manner, the user may revisit the user interfaces 500 and/or 600 as appropriate to select additional members from a given dimension, delete previously-selected members from that dimension, and/or reorder those members selected from the dimension.

Returning to the example scenario described above, regarding reporting sales in Canada, the United States, and France, in Canadian dollars and United States dollars, the selected members area 802 may arrange the selected member representations 806 and 808 as follows:

| Canada | Canadian dollars |
|---|---|
| United States | United States dollars |
| France | |

As indicated by the above example of mappings between intersecting members, sales occurring in Canada would be reported in Canadian dollars, while sales in the United States and France would be reported in United States dollars. More specifically, the techniques described herein may accomplish this mapping without, for example, users explicitly connecting the member sets from one dimension with the member sets from other dimensions. In addition, the techniques described herein may accomplish this mapping without creating, sending, and maintaining metadata that performs this mapping. Instead, the techniques described herein may infer the mapping between member sets based on how the members are aligned relative to one another in the user interface 800. In addition, these techniques may store these inferred mappings in the intermediate file or storage mechanisms described above, for later reference when generating queries.

The user interface 800 may also include ordering tools 812, which may be operative to reorder selected members relative to other members within a given dimension. The user may activate the ordering tools 812 as an alternative to activating the edit tools 810 to return to the user interface is shown in FIGS. 5 and 6. Examples of the ordering tools 812 may include buttons labeled with arrows, or the like, as appropriate to convey to users the reordering functions provided by the ordering tools 812.

The user interface 800 may also include one or more instances of delete tools 814. These delete tools 814 may be operative to delete selected members within a given dimension.

The user interface 800 may also include an area 816 for providing rendering options to the user examples of these rendering options were discussed above in FIG. 7, relating to blocks 704-710. For example, the rendering options area 816 may include a selection tool 818 that is responsive to user input to activate a symmetrical mode for rendering queries. In addition, a preview field 820 may provide a grid layout illustrating how the query may be rendered in symmetrical mode.

In addition, the rendering options area 816 may include a selection tool 822 that is responsive to user input to activate an asymmetrical mode for rendering queries. A preview field 824 may provide a grid layout illustrating how the query may be rendered in asymmetrical mode.

FIG. 8 illustrates at 826 intersections between members that are selected from a plurality of different dimensions. In turn, the UI 800 may provide these member intersections eight to six for construction and rendering into a query.

CONCLUSION

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

In addition, certain process and data flows are represented herein as unidirectional only for the purposes of facilitating this description. However, these unidirectional representations do not exclude or disclaim implementations that incorporate bidirectional flows.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-readable storage medium having computer-executable instructions stored thereon which, when executed by a computer, cause the computer to perform a method comprising:
presenting via a user interface, representations of dimensions associated with members stored in a data model against which a query is run, the dimensions defining a hierarchical structure of the data model;
presenting representations of a first plurality of the members and a second plurality of the members, the first plurality associated with a first dimension and the second plurality associated with a second dimension;
enabling selection of a first subset of the first plurality of the members and a second subset of the second plurality of the members;
enabling arrangement of the first subset in a first order and the second subset in a second order; and
enabling selection of
a symmetrical rendering mode in which the query is constructed by cross-joining the first subset and the second subset, and
an asymmetrical rendering mode in which the query is constructed as an asymmetrical matrix by cross-joining a first-ordered member of the first subset with a first-ordered member of the second subset, and a second-ordered member of the first subset with a second-ordered member of the second subset.

2. The storage medium of claim 1, further comprising instructions for invoking an asymmetric query capability within a report generation environment.

3. The storage medium of claim 1, further comprising instructions for receiving a selection of a first one of the dimensions from a user, and wherein the instructions for presenting representations of the first subset are executed in response to the user selecting the first dimension.

4. The storage medium of claim 1, further comprising instructions for constructing the query.

5. The storage medium of claim 1, wherein a number of members in the first subset is different from a number of members in the second subset.

6. The storage medium of claim 5, further comprising instructions for adding members to the first subset or the second subset to make the number of members in the first subset equal to the number of members in the second subset.

7. The storage medium of claim 1, further comprising instructions for enabling reordering of the first subset or the second subset.

8. A computer-readable storage medium having computer-executable instructions stored thereon which, when executed by a computer, cause the computer to provide at least one user interface comprising:
representations of a first dimension and a second dimension, the first dimension and the second dimension associated with members of a data model against which a query is run and at least partially defining a hierarchal structure of the data model;
representations of a first plurality of members associated with the first dimension and arranged in a first order;
representations of a second plurality of members associated with the second dimension and arranged in a second order;
a first mode selection tool for activating a symmetrical rendering mode in which the query is constructed by cross-joining the first plurality of the members with the second plurality of the members; and
a second mode selection tool for activating an asymmetrical rendering mode in which the query is constructed as an asymmetrical matrix by cross-joining a first-ordered member of the first plurality of the members with a first-ordered member of the second plurality of the members and cross-joining a second-ordered member of the first plurality of the members with a second-ordered member of the second plurality of the members.

9. The storage medium of claim 8, further comprising instructions for providing an ordering tool for modifying the first order or the second order.

10. The storage medium of claim 8, further comprising instructions for providing an edit tool for presenting a further user interface for selecting the first plurality of the members or the second plurality of the members.

11. The storage medium of claim 8, further comprising instructions for providing a preview field for illustrating a query rendering performed in the symmetrical rendering mode.

12. The storage medium of claim 8, further comprising instructions for providing a preview field for illustrating a query rendering performed in the asymmetrical rendering mode.

13. The storage medium of claim 8, further comprising instructions for providing a selected members area for illustrating mappings between respective members of the first plurality of the members and the second plurality of the members.

14. The storage medium of claim 13, wherein the instructions for providing the selected members area in the user interface comprise instructions for updating the mappings in response to receiving user input for reordering the first plurality of the members or the second plurality of the members.

15. The storage medium of claim 8, wherein the second mode selection tool provides an option for performing a column-by-column rendering mode.

16. The storage medium of claim 8, wherein the second mode selection tool provides an option for performing a row-by-row rendering mode.

17. A computer-implemented method comprising computer-implemented operations for presenting a user interface having:
   representations of a first dimension and a second dimension, the first dimension and the second dimension associated with members of a data model against which a query is run and at least partially defining a hierarchal structure of the data model;
   representations of a first plurality of members associated with the first dimension and arranged in a first order;
   representations of a second plurality of members associated with the second dimension and arranged in a second order;
   a first mode selection tool for activating a symmetrical rendering mode in which the query is constructed by cross-joining the first plurality of the members with the second plurality of the members; and
   a second mode selection tool for activating an asymmetrical rendering mode in which the query is constructed as an asymmetrical matrix by cross-joining a first-ordered member of the first plurality of the members with a first-ordered member of the second plurality of the members and cross-joining a second-ordered member of the first plurality of the members with a second-ordered member of the second plurality of the members.

18. The method of claim 17, further comprising instructions for providing an ordering tool for modifying the first order or the second order.

19. The storage medium of claim 17, further comprising instructions for providing an edit tool for presenting a further user interface for selecting the first plurality of the members or the second plurality of the members.

20. The storage medium of claim 17, further comprising instructions for providing a preview field for illustrating a query rendering performed in the asymmetrical rendering mode.

* * * * *